United States Patent [19]

Schrock et al.

[11] 4,343,042
[45] Aug. 3, 1982

[54] BI-DIRECTIONAL DATA TRANSMISSION AND CONTROL SYSTEM

[75] Inventors: Clifford B. Schrock; Linley F. Gumm, both of Beaverton, Oreg.

[73] Assignee: Cablebus Systems Corporation, Beaverton, Oreg.

[21] Appl. No.: 56,283

[22] Filed: Jul. 9, 1979

[51] Int. Cl.³ .......................... H04N 7/10; H04B 3/50
[52] U.S. Cl. ........................................ 455/5; 455/349; 358/86
[58] Field of Search ................... 455/3, 4, 5, 6, 2, 348, 455/349; 364/900; 358/84, 86, 114, 117

[56] References Cited

U.S. PATENT DOCUMENTS

| | | | |
|---|---|---|---|
| 3,717,813 | 2/1973 | Lieberman et al. | 455/3 |
| 3,794,922 | 2/1974 | Osborn et al. | 455/4 |
| 3,859,596 | 1/1975 | Jannery | 455/6 |
| 3,934,079 | 1/1976 | Barnhart | 455/4 |
| 3,997,718 | 12/1976 | Ricketts et al. | 455/5 |
| 4,0141,473 | 8/1977 | Bardotti | 364/900 |

Primary Examiner—Tommy P. Chin
Attorney, Agent, or Firm—Chernoff & Vilhauer

[57] ABSTRACT

A bi-directional data transmission and control system utilizing a central processing unit and a multiplicity of remote subscribers. Each subscriber is provided with a terminal coupled with the central processing unit by a suitable medium such as a CATV channel. Each terminal is provided with a demarcation plane separating common circuitry from a number of specialty modules and a common bus therebetween for circuitry simplification, application expandability and individual tailoring. The data transmission scheme efficiently utilizes the frequency spectrum and enhances polling frequency by permitting selective polling of any given specialty module or subscriber at any given time and by permitting simultaneous polling of every subscriber for service calls, thereafter locating the caller with minimal polling. Data transmission protocol is expandable or contractable for each terminal independently of others and permits data transmission between any two points in the system. The system is zoned such that failure of one zone does not disable the entire system.

5 Claims, 13 Drawing Figures

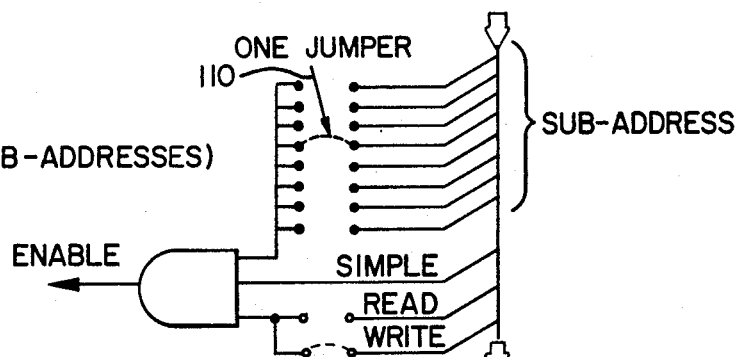
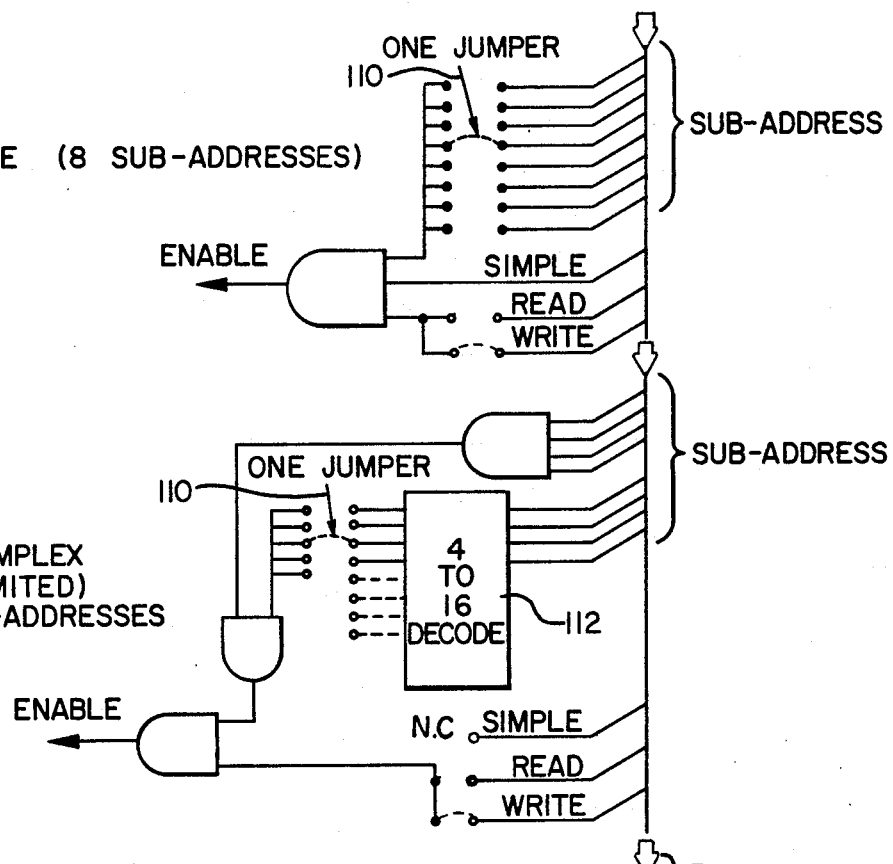
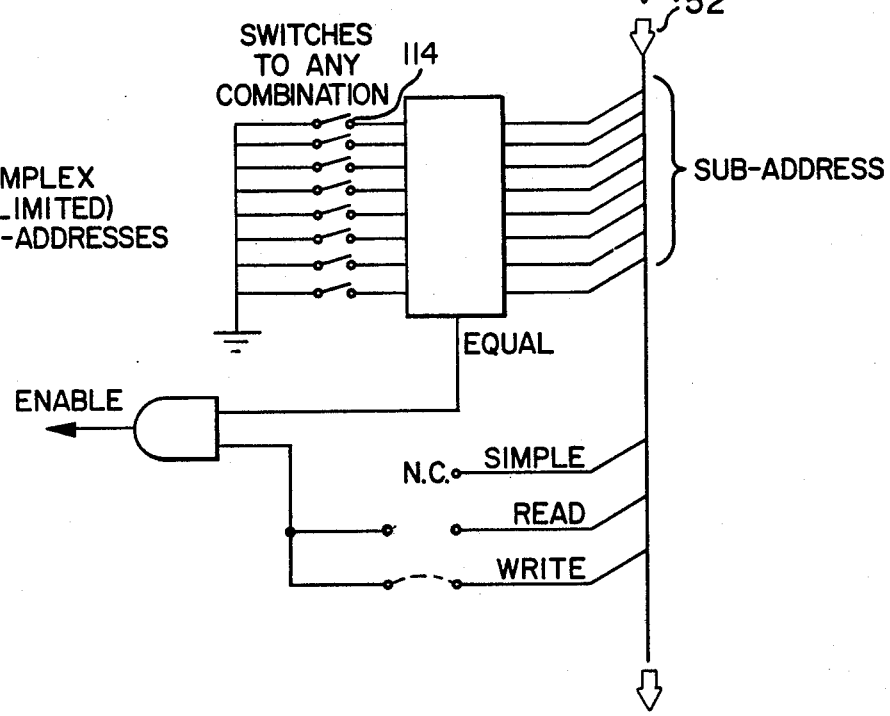

$$\frac{F\ RECEIVER \pm I.F.}{N} = F\ TRANSMITTER$$

XX DENOTE ASKII CONTROL CHARACTER

BI-DIRECTIONAL DATA TRANSMISSION AND CONTROL SYSTEM

BACKGROUND OF THE INVENTION

1. Field of the Invention

The present invention relates to the bi-directional transmission of data to and from a multiplicity of remote locations to and from a central data processing location. More particularly, the present invention relates to a remote terminal for monitoring and controlling special services especially for subscribers of cable television, hereinafter "CATV," in such applications as pay TV, security, energy consumption, subscriber response and utility reading systems capable of being regularly polled by a centrally located computer controller for status verification and control, utilizing a single CATV channel.

2. Description of the Prior Art

Known examples of related art includes U.S. patents to:

| Patentee | Serial No. | Grant Date | Assignee |
|---|---|---|---|
| Thompson et al | 3,733,430 | May 15, 1973 | R.C.A. |
| Hardy et al | 3,761,914 | Sept. 25, 1973 | Bell Television, Inc. |
| Osborn | 3,803,491 | April 9, 1974 | TOCOM, Inc. |
| Kirk et al | 3,833,757 | Sept. 3, 1974 | Computer Television, Inc. |
| Jannery et al | 3,859,596 | Jan. 7, 1975 | Computer Cable, Corp. |
| Takeuchi | 3,886,538 | May 27, 1975 | Hochiki, Corp. |
| Barnhart | 3,934,079 | Jan. 20, 1976 | Jerrold Electronics, Corp. |
| Shomo | 3,943,447 | Mar. 9, 1976 | Comsonics, Inc. |
| Savit | 3,990,036 | Nov. 2, 1976 | Western Geophysical, Corp. |
| Ricketts et al | 3,997,718 | Dec. 14, 1976 | Magnavox Company |
| Holz | 4,031,543 | June 21, 1977 | Berkeley Varitronics Systems |
| Morehead | 4,057,829 | Nov. 8, 1977 | Spectra Dyne |
| Hurney et al | 4,074,310 | Feb. 14, 1978 | Artel Mfg., Corp. |

Further examples of related art includes those appearing in trade literature and articles, as follows:

*Automatic Meter Reading By Cable* by Frank Eldridge, dated August, 1972 herein called "Eldridge."

STRINGING THE WIRED CITY by Gerald Walker, *Electronics Magazine,* Sept. 27, 1971, herein called "Walker."

*The Use of Cable Systems to Solve Traffic Control Communications* by Carl Schoeneberger, 1977, herein called "Schoeneberger."

COST BARRIER CRACKED IN TWOWAY CABLE TV by D. Stephens McVoy, *Electronics,* Feb. 20, 1975, herein called "McVoy."

*The Computer In the Living Room* by Hubert J. Schlafly, 1973, herein called "Schlafly," released by Telepromter, Corp.

*Subscriber Response System* by R. T. Callais et al., about 1972, released by Hughes Aircraft Company, herein called "SRS."

ADDRESSABLE TAPS BECOME OF AGE by Joe Hale, *T.V. Communications,* April, 1976, herein called "DVC Taps."

COMMUNICATIONS CHIP AIDS HOME SECURITY by J. E. Pascente, *Electronics,* Sept. 15, 1977, herein called "Pascente."

*New From Magnavox,* data sheet of Magnavox, about 1976, herein called "Magnavox Smart Tap."

*Contempo 2001,* brochure of Status Systems International, about 1976.

A pertinent example of using bi-directional data transmission through the medium of a single CATV channel for monitoring and controlling multiple remote devices such as subscriber polling, alarms, meter reading, TV channel selection, education and health services and the like is exemplified by the above-described Subscriber Response System (SRS).

The SRS provides each subscriber with a terminal modem coupled with a predetermined CATV channel and includes a local processing center similarly coupled with the CATV channel for periodically and sequentially polling each TM. Each terminal modem houses sufficient interfacing hardware and terminal blocks and jacks so as to convert the particular analog/digital data for up to 30 e.g., input/output data points into a message, together with sufficient data transmission hardware for propagating the message through the selected CATV channel to the central processing unit (CPU).

Each subscriber is interrogated in turn by the CPU until a group (e.g., 1,000) of subscribers has been processed. Following the interrogation period, the CPU then services the subscriber requests. When the subscriber group (e.g. 1,000) has been interrogated and serviced, the process is repeated for the next subscriber group and so on.

The above-described SRS system is deficient in several respects. The modem and data message therefor is fixed at the time of manufacture. This means that the modem only approximates the needs of a typical user and therefore in a large number of cases is either unduly complex or inherently limiting in that it either contains less or more than a particular subscriber needs.

Yet another difficulty with the SRS system is that the data message length is fixed for every subscriber thereby inhibiting subsequent expansion for individual cases and eliminating the capability of adding functions which, at the time of installation, had not yet been envisioned. It is noted that the propagation of unnecessary data for a particular subscriber, when multiplied by a large number of subscribers, results in inefficient and wasteful use of the data transmission medium and limits the frequency at which a particular subscriber can be repeatedly serviced.

The system envisioned by Osborn and made by TOCOM, Inc. also uses terminal modems having internal interfacing and data message lengths which are fixed at the time of manufacturing and thereby is deficient in many of the aforementioned ways. The data transmission sheme described by Osborn uses three simultaneous radio frequency carriers in order to achieve reliable data transmission and low cost home receivers. To further enhance polling rates without thereby necessitating higher data rates, Osborn interrogates a number of units (e.g. 10) on a common frequency, each of which responds to one of ten different frequencies. It is noted that this particular data transmission scheme uses unnecessary band width, entails inordinately complex data controls and, by reducing data transmission rates, results in little or no gain in polling frequencies.

It should be noted that, as evidenced by the above-described patents, articles, and trade literature, a variety of data transmission schemes, addressable data taps and related devices have heretofore been advanced, all of which suffer from the deficiency of being fixed at the time of manufacture to a particular scheme and thereby inherently limit the flexibility of the resultant data transmission system.

SUMMARY AND OBJECTS

OBJECTIVES OF THE INVENTION

The general objective of the present invention is to provide a flexible bi-directional data transmission and control system (hereinafter BDTCS) adaptable to a wide range of data transmission mediums, including CATV, and greatly expandable to both foreseen and unforeseen needs relative to both its hardware and its data protocol. Specific exemplary objectives include:

1. providing each terminal with an intermediate demarcation plane placing common or general purpose circuitry in a first unit which communicates with greatly expandable special circuitry placed within a multiplicity of plug-in specialty modules by means of a common bus;
2. providing the general purpose circuitry structure with internal configurability;
3. providing the general purpose circuitry structure with a self-test mode;
4. tailoring the degree of reliability or accuracy of data transmission to each separate function as required without encumbering the entire system with the complexity or accuracy required only for particular functions;
5. a fail-safe system for the respective transmitters to eliminate the possibility of system dominance by a particular defective transmitter;
6. a fail-safe system for defeating any and all attempts to alter or tamper with the system for whatever purpose;
7. accomodating the system for use with a wide range of input power systems;
8. incorporating common elements in both transmitting and receiving sections so as to obtain accuracy at minimal expense;
9. adopting a data transmission scheme which utilizes the frequency spectrum as efficiently as possible;
10. utilizing a transmission-receiving scheme for rapid message acquisition;
11. adopting a polling scheme which significantly enhances polling frequency;
12. using a data transmission protocol which can be expanded or contracted relative to a particular terminal independently of the remaining terminals;
13. using a data transmission protocol which permits data to be transmitted from any point to another point in the system (i.e. credit card verification, teletypewriter (TTY) and point of sale terminals);
14. providing selective interrogation and/or commands of any specialty module within the entire system at any given time;
15. providing selective polling of any subscriber within the entire system at any given time and in any given order;
16. providing one mass poll of every subscriber simultaneously relative to a call for alarm service and thereafter locating the service request without polling a significant portion of the entire system; and
17. dividing the overall system into a plurality of zones isolated from one another for preventing failure within a zone from disabling the entire system.

SUMMARY OF THE INVENTION

The CATV headend to be used in a system utilizing the invention is provided with a controller, of a size and complexity chosen for the system and duties to be performed with the invention. The controller can be a manual TTY, a simple micro-computer, or a more complex computer system. For most uses a computer controller will be used. This computer controller is provided with peripheral off the shelf devices such as a remote printer (possibly located in a fire, police, or dispatch location). Additional memory in the form of large core, disc, or tape can be connected so that information can be obtained "on line" to aid in the dispatching of fire, police, or service personnel required for maintenance of energy or other non-specified functions.

Interconnection capability from the computer is provided to external sources or computers such as bank, and utility company computers, information sources etc., as deemed desirable by the CATV system so that data originating in the CATV system, or desired in the system, can be freely transmitted bidirectionally from external sources, to or from any point in the system.

The computer controller is interfaced to a custom modem that accumulates the data, then converts the signals to a serial data train, using existing technology and a unique format, as hereinafter described. The information is transmitted in an FM mode at a carrier frequency chosen by the cable company that does not interfere with existing services. The signal is coupled with the headend signals at levels at least 10 dB lower than the CATV picture carriers.

Signals received from the system are converted to standard logic levels in a AM receiver, and converted from a serial sequence to a parallel format for the computer controller. The headend modem uses conventional receiver technology, however the data is both transmitted and received without encoding or transmitting a separate clock signal. The clock for the headend receiver is phase locked from the raw return data stream. The use of return AM rather than the more common choice of frequency shift keying (FSK) allows a rapid acquisition of the return signals that will be phase shifted from each other due to differences in cable length to various remote terminals.

In a home environment the invention which is called the Universal Addressable Data Terminal (UADT) is connected in the same manner that a conventional CATV connection is made. Provisions for powering the UADT from the CATV Plant can be made, and the use of a power passing coupler would be required to make use of this feature.

The signal energy passes through the UADT before distribution to the TV set. Modules are plugged onto the UADT for the particular services desired by the homeowner, such as CATV, Movie Service, Energy Controls, Fire and Burglar Controls, etc. However, a homeowner is not required to have CATV to, for instance, to have alarm service.

In a business environment, the UADT is connected in a similar manner as for the home connection; however, since many businesses will not utilize TV service. Various modules are then connected for service such as Alarms or Energy Controls. Special modules can be configured by Credit Card Verification, Point of Sale recording, and other data transactions. A high number (256) of modules could be cascaded as desired onto the invention.

Serial signals on an FM carrier along with CATV television signals enter the present system through a coax connector. An inductor taps the incoming RF line connecting to the powering compartment enabling cable powering of the device, if desired. In that case, a blocking capacitor isolates cable powering and transients from the rest of the circuit passing only RF signals.

A directional coupler is provided for the receiver and transmitter.

The receiver combines many special features to provide accurate data handling capacity and reliability with low cost. The receiver is a crystal controlled, FM design using few parts. The receiver consists of an input R.F. amplifier and preselector, MOSFET mixer, crystal oscillator, and a ceramic filter IF. A single IC is the IF, detector, and audio amplifier. A simple comparator and DC restore circuit provide clean data for the MPU.

The heart of the Universal Addressable Data Terminal, is a microprocessor. By using a specially designed program, hereinafter described, the microprocessor, hereinafter "MPU," locks onto the incoming data stream on one input/output (I/O) port and generates synchronous clocking pulses. Alternatively, a commercial serial to parallel circuit could be used. The header and address bytes of incoming signals are compared until the address of the location is recognized. For a WRITE command, the MPU then latches the sub-address and message to the output bus of the data terminals. If commanded to READ, the same sub-address and output bus is strobed from the module, and the data is regenerated in a serial sequence and transmitted to the central controller.

The transmitter is a simple keyed CW design using existing state of the art design followed by a harmonic low pass filter. The transmitter has four failsafe systems to prevent accidental runaway, since this single defect could lockup the system. The safetys are: MPU data checks to guard against continuous data being fed to the transmitter, power supply pulldown in event of continuous transmission, an R.F. monitor point that is checked by the MPU, and in event of all three failures, the UADT could, on command, blow a fuseable link powering the terminal.

A unique feature of the data system is the clock regenerator. Rather than encode clock pulses onto the data stream which requires additional bandwidth message packet length, the system idles between transmissions at a half-rate clock frequency. All messages are sent synchronously without header information on each byte. The clock pulse is extracted directly from the data using a phase lock loop regenerator. The regenerator circuit consists of an edge finder, driving an error amplifier. Whenever a data transition occurs, it is compared to the internal, free running clock. If an error exists, a correction voltage is applied to the oscillator. Because DATA or IDLE clock is continuously present, long time constants are chosen so that it takes many clock transitions to either drift or correct an error. This has proven to be effective for reliable data transmission.

Another feature is the establishing of an intermediate data bus. The bus consists of 8 data lines and 8 address lines, as well as READ, WRITE and SIMPLE control lines. Powering is also available on the bus terminals. A push on RF., coax connector is also a part of this bus. The bus is provided to permit external modularity and expandability. Simple decoding to the bus for low cost services can be accomplished with a few parts; i.e., the design permits complex services, or large numbers of modules, or both to be accommodated with a single UADT. The RF portion of the bus can be continued for functions such as a CATV switching then, using a physically narrower module that only fits over the data bus, functions such as alarms or energy controls not requiring RF can be accommodated.

Yet further features and advantages of the present invention will become apparent, and the full nature of the invention will be more fully presented, in the accompanying drawings and the following description and claims.

BRIEF DESCRIPTION OF THE DRAWINGS

FIG. 4 is a schematic diagram of SIMPLE bus address decoder for a specialty plug-on module utilizing few parts.

FIG. 5 is a more complex bus address decoder intended for multiple task plug-on modules such as a multiple subscriber TV module.

FIG. 6 is the most complex, most versatile bus address decoder allowing a plug-on module to be field programmed for any bus sub-address.

DETAILED DESCRIPTION OF THE INVENTION

Figure 1:
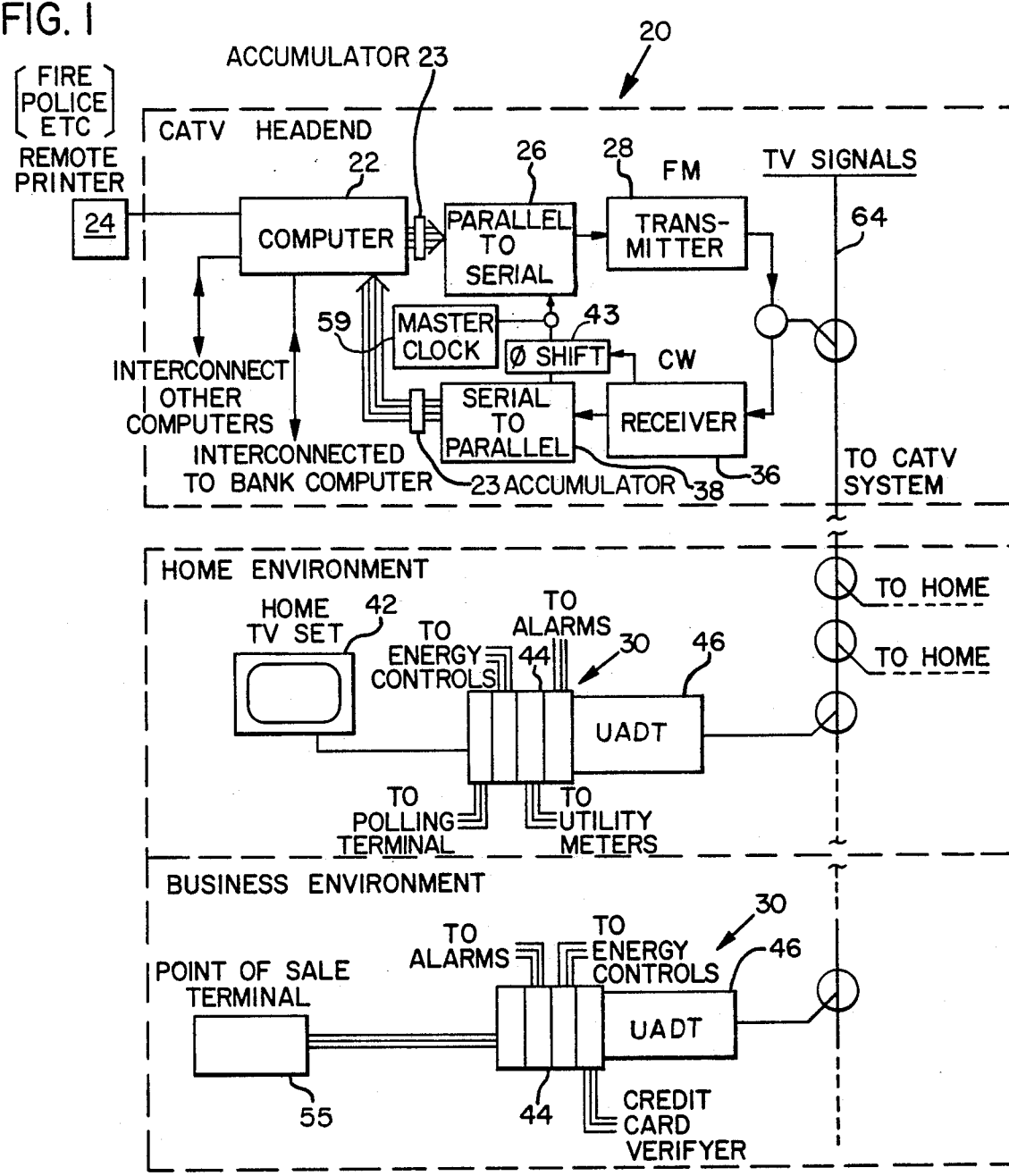
FIG. 1 is an overall block diagram of a preferred embodiment of a complete system utilizing the Universal Addressable Data Terminal (UADT). Both the home environment and the business environment are shown with typical connections and services.
Figure 2:
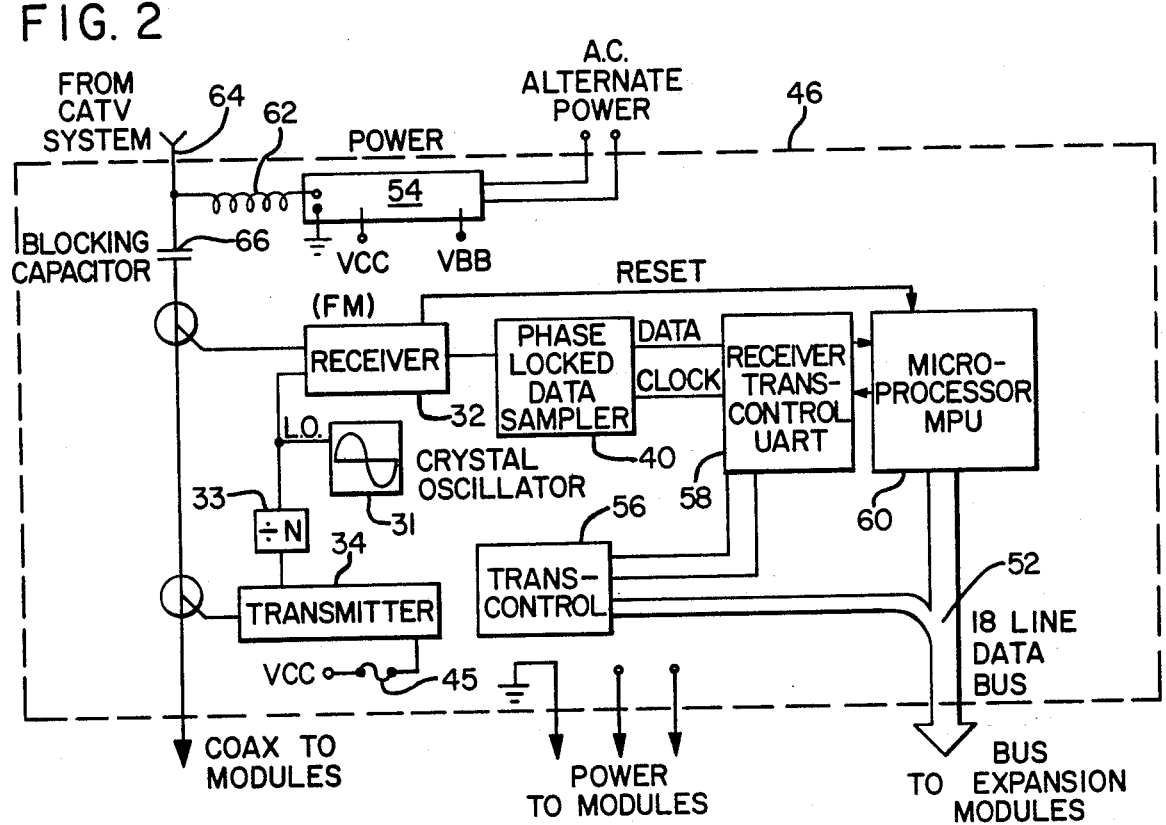
FIG. 2 is a block diagram of a preferred embodiment of the present UADT.

Turning now to the drawings, and initially to FIGS. 1-2 thereof, there are shown exemplary embodiments of the present Bi-Directional Data Transmission and Control System 20 (BDTCS) incorporating a pair of exemplary end-user applications.

The present BDTCS 20 is exemplarily shown as using a CATV headend including a centrally located computer 22 for data processing operations. The computer size is chosen for the particular system and duties to be performed with the invention; but could comprise a simple controller, a manual TTY or a complex computer system. In one embodiment, the computer is a dual DEC PDP/11 controller as manufactured by Digital Equipment Corporation with remote printing terminals 24, which is programmed in accordance with the present data protocol to provide a multiplicity of subscribers with:

(a) control of local off-air TV stations, message channel, and weather channel;
(b) control of premium movie service, pay per view;
(c) control/monitoring of entry alarms, fire alarms, emergency alert panel (fire, police, medic) and a light cycling outlet; and
(d) energy conservation including temperature turndown, water heater control, outside lighting control, sprinkler controls and load leveling.

The computer 22, shown in a CATV headend, is ordinarily provided with peripherals including a wide range of off-the-shelf items and, perhaps, a remote printer located in a fire, police or dispatch location for identifying problem areas and optimum routes thereto. Additional memory in the form of large core, disc or tape can be connected so that information can be obtained "on line" to aid in the dispatching of fire, police, energy and other services and functions.

Interconnection capability from computer 22 is provided to intercouple external sources or computers, located in banks, utility companies and other information centers, as deemed desirable by the BDTCS system 20, so that data originating in the system, or desired in the system, can be freely transceived bidirectionally from any source to or from any point in the system.

Computer 22 is interfaced to an accumulator 23 which stores a data message from the computer until the message is complete and the system is ready to take a message. A custom modem 26 converts the signals to a serial data train, using existing technology, with a format as described hereinafter in the discussion relating to FIG. 7. The serial data train is transmitted by transmitter 28 in a FM mode at a carrier frequency chosen by, for example, the cable company so as to not interfere with existing services. The transmission medium is exemplarily shown as a pre-existing CATV channel; however, other mediums such as a dedicated coax cable could be employed. In the CATV mode, for example, the signal is coupled with the head end signals at a level equal to 10 db or lower than the CATV picture carriers.

Each subscriber is provided with a terminal 30 configured to operate in virtually any two frequency ranges. Independent transmit and receive modules are available; however, in the preferred system, costs are reduced by using interlaced frequency TRANSMIT/RECEIVE module. These share a common crystal oscillator 31 and the receiver 32 (FIG. 2) operates at X2, X3, X4, or X5, plus or minus the IF frequency (typically, 10 MHz) multiples of the transmitter 34 frequency by virtue of divider 41. As a common example, 74 MHz RECEIVE and 32 MHz TRANSMIT frequencies are used. The receiver is a wideband FSK unit, while the return transmitter is keyed CW. These are optimum from both reliability and economic standpoints.

Figure 9:
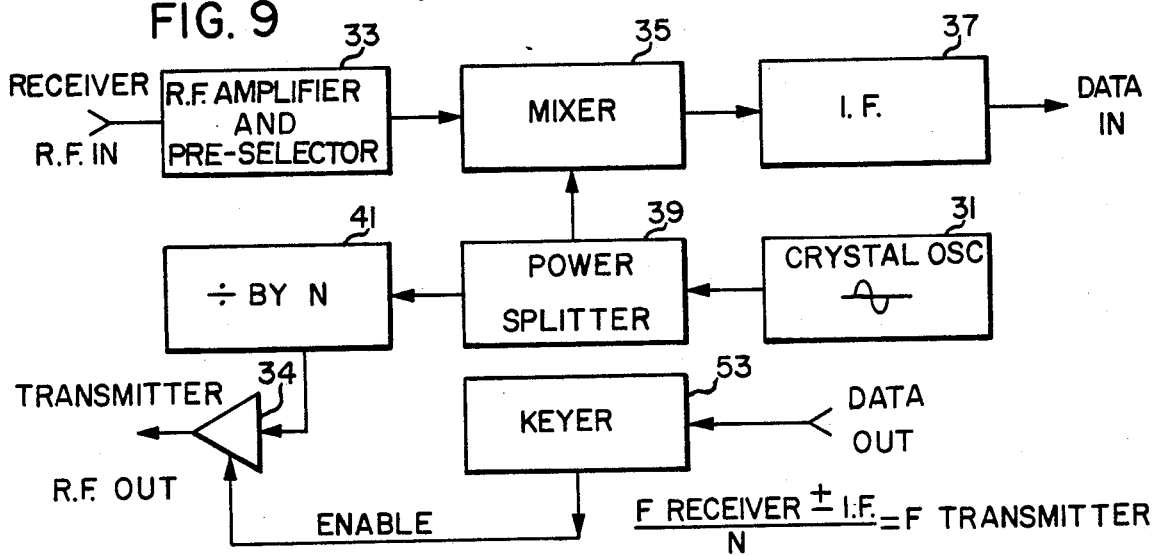
FIG. 9 is a block diagram of the interlaced receiver transmitter sharing a common crystal oscillator.

As best seen in FIG. 9, incoming RF signals to the receiver are amplified by RF amplifier and preselector 33, combined with the signal from crystal-controlled oscillator 31 and power splitter 39 in mixer 35 and the resultant signal is passed through IF stage 37 before being injected into phase locked data sampler 40. The signal from oscillator 31 and power splitter 39 are divided by an integer (N) in divider 41, with the divided signal being propagated by RF transmitter 43 under the control of keyer 45. It will be seen then that the frequency of receiver 32, plus OR minus the IF frequency, and divided by N will be equal to the frequency of transmitter 43. It is noted that the optimum integers (N) are 2, 3 and 4.

Referring to FIG. 1, signals received from the subscribing terminals 30 are converted by AM receiver 36 to standard logic levels and injected into both the SERIAL-TO-PARALLEL converter 38 and the PHASE SHIFTER 43. The master clock signals are phase shifted to correct for the time delay of the system. The data and clock pulse are then forwarded to a custom modem 38 which converts these signals from a serial sequence to a parallel format for use by computer 22. It is significant to note that the data is both transmitted and received without encoding or transmitting a separate clock signal. The clock signal is instead regenerated from the raw data stream using a phase lock loop regenerator; i.e., 40 of FIG. 2, in the home terminal and a phase shifter in the CATV headend unit, as hereinafter described.

Figure 13:
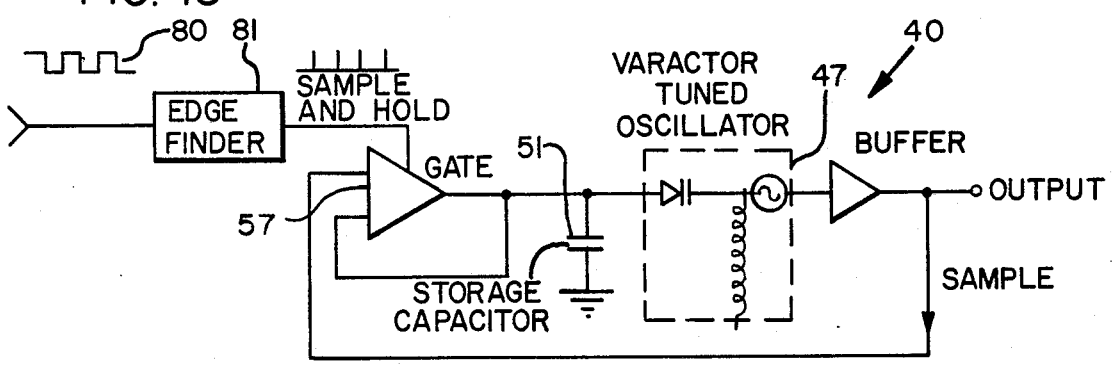
FIG. 13 is a schematic diagram of the clock regenerator circuit used to derive a clock pulse in the UADT from the data stream.

Referring particularly to FIG. 13, the receiver clock phase-lock-loop regenerator 40 for terminal 30 locks a local varactor-tuned LC oscillator 47 to the data using a sample-and-hold or phase-lock-loop gated-amplifier 57. The data is converted to a narrow pulse whose leading edge is coincident with every digital transition. The pulse gates a sample-and-hold gated-amplifier 57 during each edge. If an error is detected during the gate, an error voltage is impressed and held by the storage capacitor 51. The voltage tuned varactor oscillator 47 shifts frequency accordingly. Large time constants and a synchronous data stream, combined with ½ rate clock frequency between data transmissions allow the clock regenerator 40 to extract clock information directly from the data stream.

In a home environment, FIG. 1, the CATV cable is connected to terminal 30 through UADT 46 before distribution to the TV set 42. Specialty modules, referred to generally by numeral 44, are coupled with common circuitry 46 of the terminal 30, as hereinafter described. Common circuitry is defined as the minimum circuitry required by each and every user. In this fashion, each terminal can be customized according to the individual subscriber needs to couple the system to particular services desired by the homeowner, such as CATV, Movie Service, Energy Controls, Fire and Entry Controls and the like. It should be noted, however, that a subscriber need not have CATV to have, for instance, alarm service.

Figure 3:
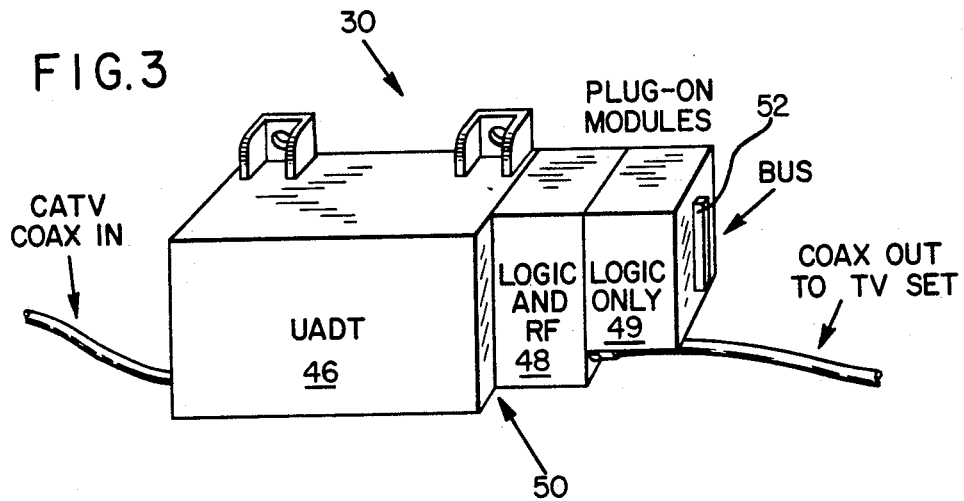
FIG. 3 is an illustration of the physical external modularity of the of the preferred embodiment of the UADT.
Figure 8:
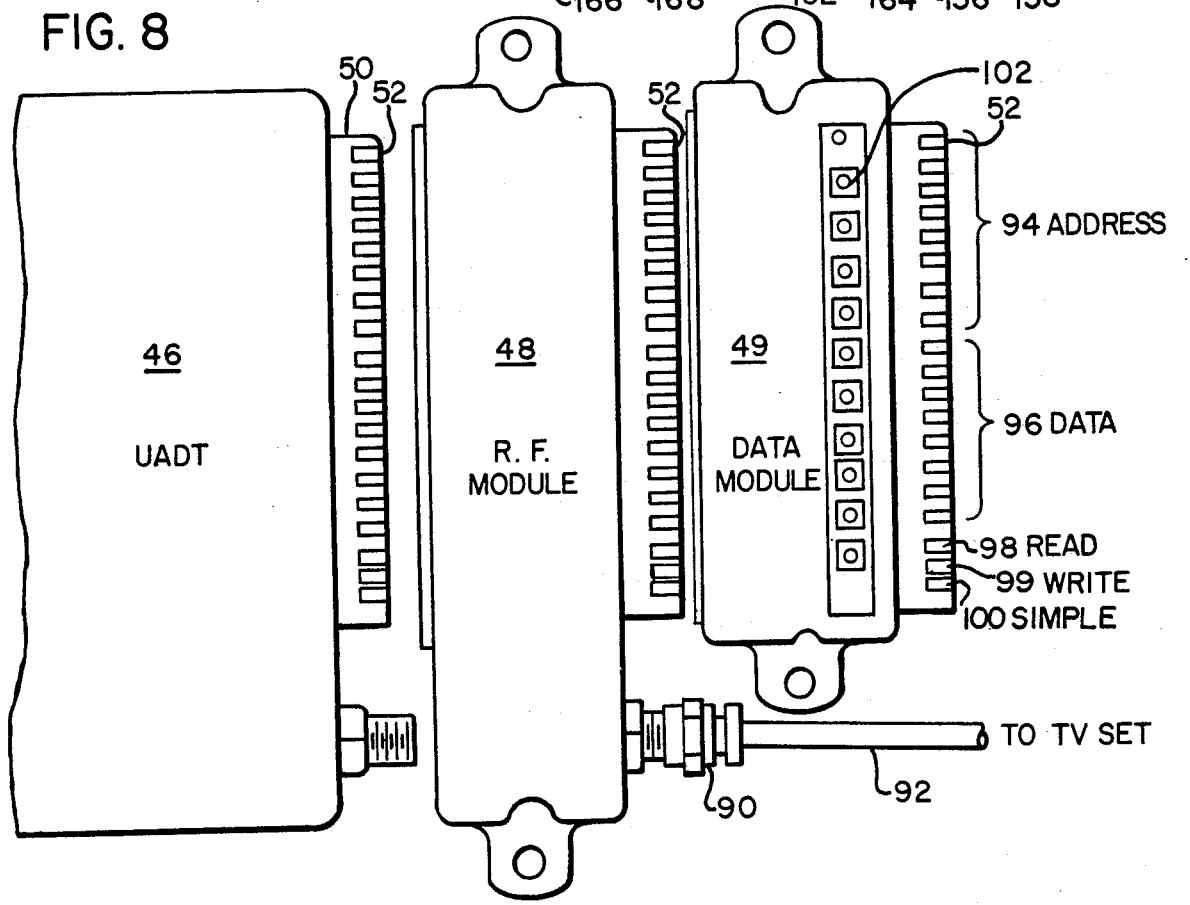
FIG. 8 is an illustration of the physical external modularity showing the bus that continues through each plug-on module, and the width difference of a DATA ONLY and an RF module.

As best seen in FIGS. 3 and 8, the BDTCS 20 provides each subscriber with a terminal 30 for receiving and transmitting data, address and commands to the processing center and the subscriber's peripheral equipment. The output connector 50 of terminal comprises a demarcation plane 50 separating UADT common circuitry 46 (required for each and every subscriber) from a great number of specialty modules, exemplarily shown as module 48 and module 49, which are interconnected with UADT 46 by means of a common data bus 52. The advantages afforded by this demarcation plane concept include circuitry simplification, application expandability and individual tailoring of services to subscriber requirements and desires.

As shown in FIG. 1, system connection in a business environment is similar to a home connection except that many businesses may not use TV service. Here, the various specialty modules 44 are connected to such services as alarms and energy controls. Further, other specialty modules are also configured to special services, exemplarily shown as point of sale terminals 55, credit card verification, payroll and other data transactions. At least two hundred and fifty six speciality modules can be cascaded as desired onto the UADT common circuitry 46.

The common circuitry 46 of the present BDTCS 20 comprises a unique programmable, Universal Addressable Data Terminal (hereinafter called "UADT" for efficiently using the frequency spectrum and significantly increasing polling frequency by permitting selective pulling of any given specialty module or subscriber at any given time and by permitting simultaneous polling of each and every subscriber for service calls, thereafter locating the calling subscriber with minimal polling.

As best seen in FIG. 2, UADT 46 is housed in the terminal 30, and comprises a plurality of function modules including a power module 54, receiver module 32, transmitter module 34, control module 56, Universal Asynchronous Receiver/Transmitter (UART) module 58 and a microprocessor 60, together with a 19 line I/O data bus 52.

The power module 54 is of suitable design for providing +15 and +5 VDC, together with converting AC alternate power and supplying a standby 30 5 VDC line for critical memory functions such as meter reading, memory and emergency (alarm) signaling during power outages. An inductor 62 taps the incoming line 64 isolating R.F. signals from the power module and connecting same with the power module enabling cable powering of terminal 30, if desired. A blocking capacitor 66 isolates cable powering and transients from the terminal, passing only R.F. signals.

Receiver module 32 combines many special features to provide accurate data handling capability and reliability with low cost. The receiver is a crystal controlled, FM design using few parts and, as shown in FIG. 9, comprises an input RF amplifier and preselector 33, MOSFET mixer amplifier 35, single crystal oscillator 31 and a ceramic filter IF 37, which is a single IC containing the IF, detector and audio amplifier. A simple comparator and DC restore circuit provide clean data for microprocessor 60 (hereinafter called MPU 60).

Figure 12:
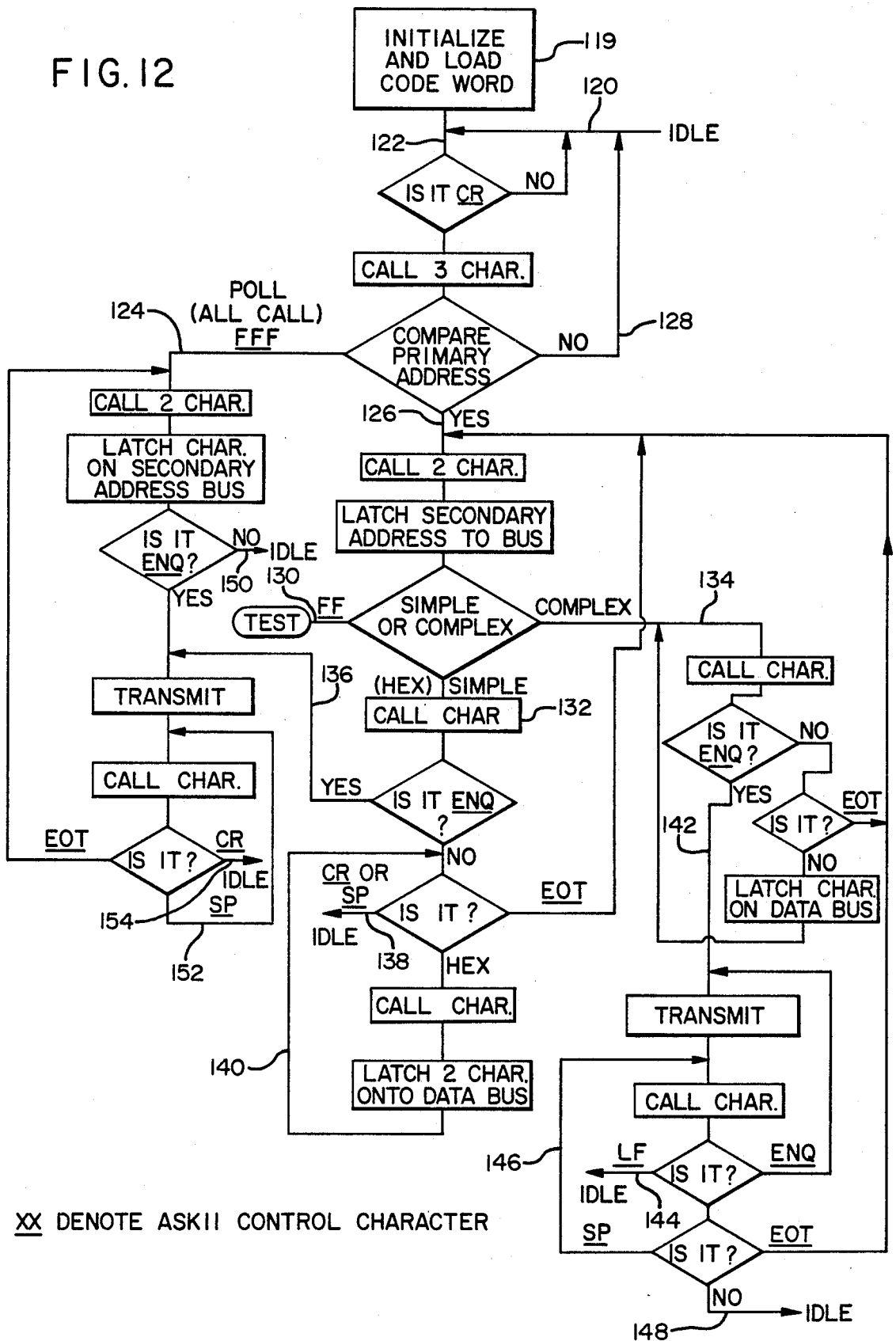
FIG. 12 is a logic flow diagram showing a simplification of the MPU performance under various conditions.

The entire digital function of UADT 46 is performed by the MPU 60. Once MPU 60 is suitably programmed in accordance with the teachings of the present invention (as shown in FIG. 12, hereinafter discussed) it locks onto the incoming data stream on one I/O port and generates synchronous clocking. As is hereafter more fully explained in connection with FIG. 7, the address 160 of incoming signals is compared until the address of the location is recognized. The MPU then latches the sub-address 162 and message 164, 166 to data bus 52 for forwarding to the specialty modules (i.e. 48, 49 of FIGS. 3 and 8). If commanded to READ, the same sub-address and data bus is strobed from the module, and the data is regenerated in a serial sequence for forwarding to the central computer 22 via transmitter 34 and signal cable 64.

Transmitter 34 is a simple keyed CW design using existing state of the art design and components, followed by a harmonic LP filter (not shown). Transmitter 34 is provided with four failsafe systems to prevent accidental runaway, since this single defect could otherwise lock up the engine system. The safeties are:

(a) MPU 60 programming for detecting a condition where continuous data is being fed to transmitter 34;
(b) power module 54 pull down in the event of continuous transmission;
(c) MPU 60 programming for checking an R.F. monitor point; and
(d) in the event of all three failures (a)–(c), UADT 46 could, no command, blow a fuseable link 45 connecting transmitter 34 with the power module 54.

As best seen in FIG. 13, one unique feature of the present receiver which does not require additional bandwidth is that BDTCS 20 idles between real data transmissions with half-rate clock signals 80. All messages are sent synchronously without header information on each byte. The clock signal is extracted directly from the data using phase locked data sampler 49. This circuit an edge finder 81 driving a gated error amplifier 57. Whenever a data transition occurs, it is compared with the internal, free running varactor-tuned oscillator 47. If an error exists, a correction voltage is applied to the oscillator 47. Because DATA or IDLE clock is continuously presented, long time constants are chosen so that it takes many clock transitions to either drift or correct an error.

As best seen in FIG. 8, an extremely important feature is the provision of a 19 line data bus 52 which is common to the UADT 46 and each of the specialty modules (i.e., 48, 49 etc.) and includes a push-on R.F. coax connector 90 and coax cable 92. The data bus 52 in addition to cable 92 also comprises eight data lines 94, eight address lines 96, as well as READ line 98, WRITE line 99, 100 respectively.

The significance of these features includes permitting external modularity and expandability. As is hereinafter more fully explained, however, the sub-addressing scheme including parallel ASCII capability, coupled with gating lines data/commands/requests to and from a multiplicity of specialty modules, the circuitry of each being designed for a specific application. Further, the design permits complex, modules large numbers of modules, or both to be accommodated. The RF portion of the bus can be included in modules that require it, e.g., for functions such as CATV switching, then, using narrower modules that are closely physically conformed to the connectors carrying to the bus, functions such as alarms or energy controls not requiring RF can be accommodated.

Referring now particularly to FIG. 1 and FIGS. 4–6 built into the system protocol are self-test modes for providing reliable system operations. The system computer 22 (FIG. 1) generates READ/WRITE interrogate sequence. The command sequence is converted into a "WRITE" function on bus 52. Simultaneously, the new bus status is read and re-transmitted to central computer 22. Comparison of the returned data to the sent data is a self-test mode permitting error detection and a cumulative error rate calculation. Conversely, READ ONLY interrogation sequence transmits the bus information or status to the central computer. This latter mode checks terminal 30 status without disturbing the bus state.

At the modular level, depending upon function complexity and error implications, additional combination commands and check-sum capability are readily implemented. For instance, the subscriber control, multiple and sequential commands are required for a connect or disconnect. For a data transmission module, check-sum could be implemented in the plug-on module if a high degree of accuracy were required.

The decoding of module sub-addressing on bus 52 is handled in any of several ways, depending upon the flexibility desired. A SIMPLE decode mode (FIG. 4) starts with each specialty module programmed to one of eight sub-address locations, by placing jumpers 110 in their respective locations. After a settling time, a READ command sets the bus to an input mode and transfers the module data on the eight bit word line into UADT 46 for transmission to central computer 22. This scheme creates 8 sub-addresses. FIG. 5 illustrates how jumpers 110 and a four to sixteen decoder 112 can be combined to obtain sixteen sub-addresses. Further, FIG. 6 indicates a scheme for readily obtaining two hundred and fifty six sub-addresses by comparing the status of switches 114 with the sub-addresses 162 presented by bus 52.

Continuous READ commands for a sub-address will transmit eight bit data words from a module in sequence. This is useful for relatively slow data transmission requirements of credit card verifiers and point of sale terminals. A WRITE command reverses bus 52 allowing an eight bit word from central computer 22 to enable a module function.

Bus 52, to restate, contains a bi-directional eight bit word on the eight lines 96, plus eight sub-address lines 94, a READ line 98, a WRITE line 99 and a SIMPLE line 100. It is this combination, coupled with the sub-addressing scheme of FIGS. 4, 5, or 6 and the demarcation plane concept of FIG. 3, which allows a single UADT 46 to control up to 256 diverse modules or complex functions. Since each specialty module, such as module 49, can produce 256 switch closure commands and can sense 256 switch closures by sub-address, and each sub-address can accept words in parallel (for example ASCII code), the present system is flexible, powerful, and readily customized to fit almost any particular environment with a minimum of hardware duplication.

Message protocols are set on the system, but can be finalized by the user. Typically, SIMPLE sub-address locations are assigned system wide to common functions; i.e., sub-address TWO - TV and Pay TV, THREE - Security, FOUR - Energy and so on. Serial message packets to and from each are variable word length, reducing the polling time of the entire system.

Data packets are sent to all subscriber terminals 30 concurrently. As a specific UADT 46 detects its own address, it acts upon the data, sub-address and command control signals.

Figure 7:
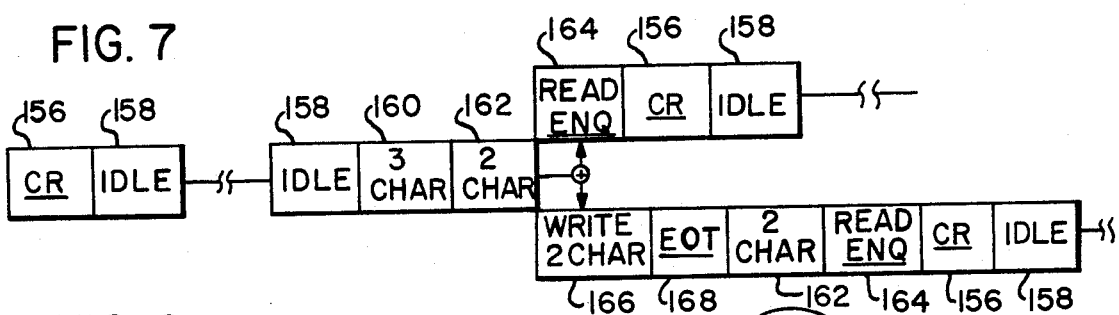
FIG. 7 is a system protocol diagram showing the makeup of a READ or WRITE message to any UADT on a system. All characters are ASCII.

Referring now to FIG. 7, each data packet comprises eight-bit words (ASCII) arranged in serial sequence as follows:
  (a) initially a CARRIAGE RETURN (CR) 156 resets all terminals and causes same to begin testing for messages;
  (b) intermediately sending IDLE signals 158 at half-clock-rate with regeneration of clock in each terminal;
  (c) for a simple READ message:
     (i) three characters 160 denoting the address of the desired terminal or terminals,
     (ii) two characters 162 denoting the sub-address of the desired specialty module,
     (iii) a READ command (ENQ) 164,
     (iv) a CARRIAGE RETURN (CR) 156 to clear the terminal and cause same to begin testing for the next message, and
     (v) IDLE signals 158 until next message; or
  (d) for a combined WRITE/READ command:
     (i) three characters 160 denoting the address of the desired terminal or terminals,
     (ii) two characters 162 denoting the sub-address of the desired specialty module,
     (iii) a WRITE command 166 is automatically enabled if the next character is not ENQ and is followed by a 2nd character comprising the data to be written (i.e., command to turn on TV),
     (iv) an END-OF-TEXT signal (EOT) 168 prepares terminal 30 for next specialty module selection,
     (v) two characters 162 denoting the sub-address of the next specialty module,
     (vi) a READ command (ENQ) 164,
     (vii) a CARRIAGE RETURN (CR) to clear the terminal and cause same to begin testing for the next message, and
     (viii) IDLE signals 158 until next message.

The significance of the above-described data protocol is that it provides a variable-length message packet for data messages of varying degrees of complexity.

Address selection in each UADT 46 is programmed by breaking the circuit foil in a binary code on the controller board. In addition, parity and self-test capabilities are provided in the system protocol.

Figure 10:
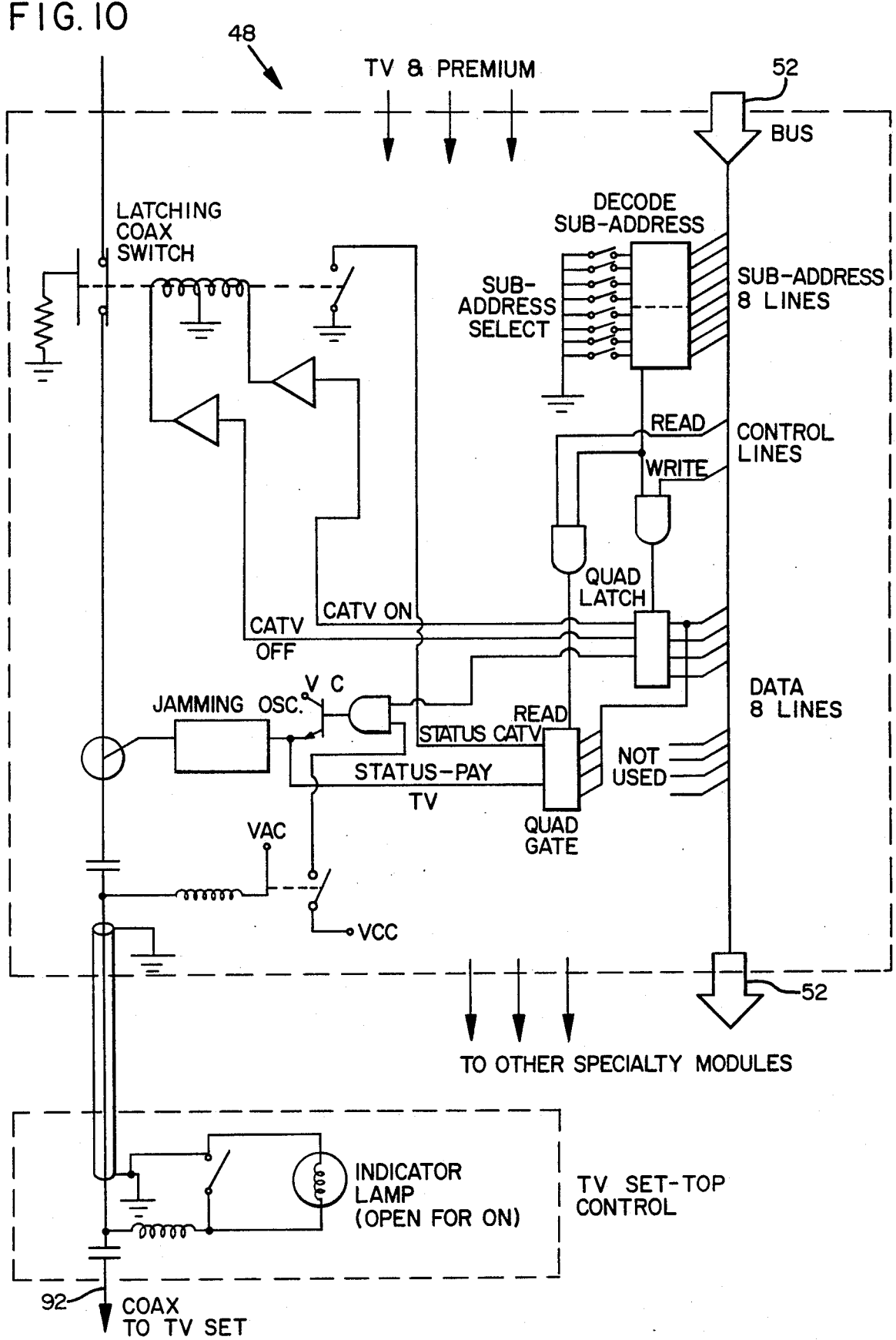
FIG. 10 is a schematic block diagram depicting an exemplary plug-on module for TV and Premium (movie channel) control.

Turning now to the remaining drawings, FIG. 10 provides a schematic block diagram of an exemplary embodiment of module 48 which indicates the requisite circuitry required to controllingly provide a remotely located subscriber with pay TV services.

Figure 11:
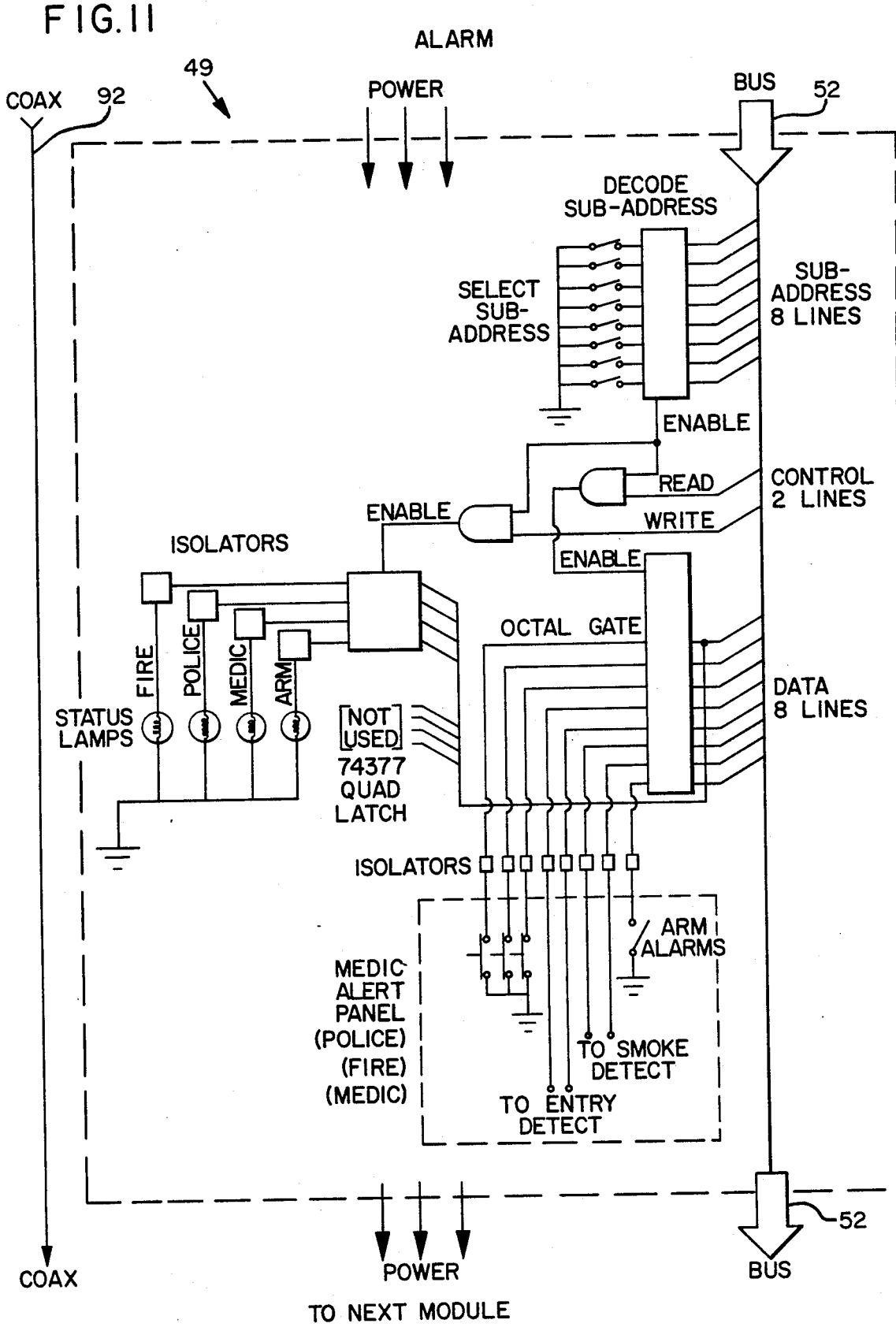
FIG. 11 is a schematic block diagram depicting an exemplary plug-on module intended for home alarm service.

FIG. 11 provides a schematic block diagram of an exemplary embodiment of module 49 which indicates the requisite circuitry required to controllingly provide a remotely located subscriber with alarm and detection services.

FIG. 12 sets forth a flow diagram depicting generally exemplary programming for terminal 30. During power up (indicated by block 119, idle line 120 and line 122) all terminals are cleared with ASCII character CR, the system 20 begins propagating half clock rate signals IDLE and each terminal begins testing for the presence of a data message. It should be noted that system 20 and terminals 30 use each end of message signal CR to prepare for the next message and then uses the above-described edge testing to differentiate between IDLE and real data. This eliminates the need to generate a separate header for each message.

Once a message packet is received, each terminal 30 calls three characters, and, if less than three are received, the erroneous message will be ignored. If the three characters are ASCII "FFF" (an all terminals poll), each terminal will branch to poll ENQUIRY via line 124. If the three characters are a discrete address of a particular terminal, that terminal will branch to DATA INTERPRETATION via line 126, with the remaining terminals branching to IDLE routine via line 128.

During DATA INTERPRETATION (line 126) only the addressed terminal 30 will call two more characters. These characters are the sub-address denoting the desired specialty module and determine subsequent processing as follows:
  (a) if ASCII "FF," the terminal branches to the desired test routine via line 130;
  (b) if numeric, the terminal enters SIMPLE processing via line 132 to, i.e., check the status of a burglar alarm; or (c) if alpha characters, the terminal branches to COMPLEX processing via line 134 to, i.e., transmit or receive complex messages such as point of sale messages.

In the event of SIMPLE data processing (line 132), an additional character is called to determine whether or not this is an ENQUIRY (ENQ); if so, processing branches to the ENQUIRY portion of the poll inquiry sub-routine via line 136. If this is a CR or SPACE (ASC11 SP), processing returns to idling via line 138; if END OF TEXT code (ASC11 EOT), processing returns back to line 126 to receive next sub-address; otherwise, data is presumed and processing calls more data, latches two characters on bus 52 and then loops back via line 140 to test for CR, SP or EOT. Note that the SIMPLE mode also utilizes the address portion of the bus in a simplified manner, limiting speciality modules to eight sub-addresses, each corresponding to one line of the address bus.

COMPLEX mode is automatically selected if the secondary address is presented in ASC11 alpha characters. In the event of COMPLEX data processing (line 134), processing calls a character and tests for ENQ. If not ENQ, processing then tests for EOT with the following results:

(a) if EOT, programming branches back to line 126 for the next sub-address; or (b) if not EOT, the character is latched on bus 52 and programming returns to line 134 for another character.

During the COMPLEX data enquiry (line 142), processing transmits the requested data to computer 22, calls another character and tests for LINE FEED (LF) and ENQ. If LF, processing returns to IDLE via line 144; if ENQ, processing returns to line 142 to transmit the requested data; otherwise, processing tests for SP and EOT. If the word is SP, processing loops back via line 146 to call another character; if EOT, processing loops back to line 126 for more data; otherwise, processing returns to IDLE via line 148.

In the event of a SYSTEM POLL (line 124), processing calls two characters, latches a sub-address and then tests for ENQ. If not ENQ, processing returns to IDLE via line 150; otherwise, processing transmits the requested data, calls another character and then tests for EOT, CR or SP. If EOT, processing loops back to line 124 for the next sub-address; if SP, processing loops back via line 152 to call another character; or if CR, processing returns to IDLE via line 154.

The use of the terms in the foregoing abstract and description are used by way of description only and not by way of limitation, and it is understood that the scoop of the invention is limited only by the claims which follow.

What is claimed is:

1. In a bi-directional data transmission system including a cable television (CATV) headend, said headend including a centrally-located computer for monitoring and controlling multiple different remote service devices at each of a multiplicity of subscriber terminals coupled to said CATV headend, respective circuit means different from one another for interfacing each of said remote service devices with a respective one of said terminals, and transceiver means for sending and receiving serial message packets bi-directionally between said CATV headend and said terminals, the improvement comprising:

(a) demarcation means at each of said terminals operatively interposed between said CATV headend and said respective circuit means, said demarcation means including means for converting messages between parallel and serial formats respectively and including first data bus connecting means for initiating a data bus having multiple lines for conducting messages in said parallel format; and (b) respective modules, each containing a respective one of said circuit means and each having a pair of data bus connecting means for detachably connecting a first one of said modules to said first data bus connecting means and detachably connecting said modules consecutively to each other, and for continuing said data bus consecutively through each module from one to another thereof such that messages can be transmitted on said data bus consecutively through each module without alteration thereof by said modules.

2. In a bi-directional data transmission system including a cable television (CATV) headend, said headend including a centrally-located computer for monitoring and controlling multiple different remote service devices at each of a multiplicity of subscriber terminals coupled to said CATV headend, respective circuit means different from one another for interfacing each of said remote service devices with a respective one of said terminals, and transceiver means for sending and receiving serial message packets bi-directionally between said CATV headend and said terminals, the improvement comprising:

(a) a data bus having multiple lines at each of said terminals;

(d) data bus connecting means on each of said respective circuit means for detachably connecting multiple ones of said respective circuit means simultaneously to said data bus;

(c) demarcation means at each of said terminals operatively interposed between said CATV headend and said data bus, said demarcation means including means for converting messages between parallel and serial formats respectively;

(d) said demarcation means further including microprocessor means for varying the length of said serial message packets transmitted from the respective terminal to said CATV headend in response to the amount of data contained therein.

3. In a bi-directional data transmission system including a cable television (CATV) headend, said headend including a centrally-located computer for monitoring and controlling multiple different remote service devices at each of a multiplicity of subscriber terminals coupled to said CATV headend, respective circuit means different from one another for interfacing each of said remote service devices with a respective one of said terminals, and transceiver means for sending and receiving serial message packets bi-directionally between said CATV headend and said terminals, the improvement comprising:

(a) a data bus at each of said terminals having a multiplicity of sub-address lines and a further line separate from said multiplicity of sub-address lines;

(b) data bus connecting means on each of said respective circuit means for detachably connecting multiple ones of said respective circuit means simultaneously to said data bus;

(c) said CATV headend including means for transmitting simple sub-address data to said terminals in serial message packets of a first length, and means for transmitting complex sub-address data to said terminals in serial message packets of a length greater than said first length;

(d) demarcation means at each of said terminals operatively interposed between said CATV headend and said data bus for converting said serial message packets containing sub-address data to a parallel format;

(e) said demarcation means further including microprocessor means for selectively directing said simple sub-address data through less than all of said multiplicity of sub-address lines while activating said further line of said data bus in response to the transmission of said simple sub-address data from said CATV headend, and including means for selectively directing said complex sub-address data through said multiplicity of sub-address lines in response to the transmission of said complex sub-address data from said CATV headend.

4. The system recited in claim 1, 2 or 3 further including means for testing each of said respective circuit means by comparing a computer-initiated message packet with the response of said respective circuit means to said computer-initiated message packet.

5. The system recited in claim 1, 2 or 3 wherein said transceiver means includes respective transmitting and receiving portions at each of said terminals and frequency control means at each of said terminals having an oscillator common to both said transmitting and receiving portions respectively for operating said transmitting and receiving portions respectively at two different frequencies.

* * * * *

UNITED STATES PATENT AND TRADEMARK OFFICE
CERTIFICATE OF CORRECTION

PATENT NO. : 4,343,042            Page 1 of 2
DATED : August 3, 1982
INVENTOR(S) : Clifford B. Schrock and Linley F. Gumm It is certified that error appears in the above—identified patent and that said Letters Patent is hereby corrected as shown below:

| | | |
|---|---|---|
| Col. 2, | line 17 | Change "30 e.g.," to --e.g., 30--. |
| | line 58 | Change "responds to" to --responds in--. |
| Col. 4, | line 65 | Change "configured by" to --configured for--. |
| Col. 8, | line 3 | Change "OR" to --or--. |
| | line 28 | After "The" insert the word --digital--. |
| Col. 9, | line 28 | Change "30" to -- + --. |
| Col. 10, | line 9 | Change "no" to --on--. |
| | line 18 | After "circuit" add the word --comprises--. |

UNITED STATES PATENT AND TRADEMARK OFFICE
CERTIFICATE OF CORRECTION

PATENT NO. : 4,343,042
DATED : August 3, 1982
INVENTOR(S) : Clifford B. Schrock and Linley F. Gumm It is certified that error appears in the above-identified patent and that said Letters Patent are hereby corrected as shown below:

| | | |
|---|---|---|
| Col. 10, | line 33 | After "99" delete the comma (,). |
| | line 33 | After "99" insert the words --and SIMPLE control line--. |
| | line 38 | After "lines" insert the words --to fan-out terminals 102, permits UADT 46 to transmit and receive--. |
| | line 66 | Change "the" to --for--. |
| Col. 13, | line 10 | Change "(ASC11 SP)," to --(ASC11 SP),--. |
| | line 11 | Change "(ASC11 EOT)," to --(ASC11 EOT),--. |
| Col. 14, | line 34 | Change "(d)" to --(b)--. |

Signed and Sealed this

Eighth Day of February 1983

[SEAL]

Attest:

GERALD J. MOSSINGHOFF

Attesting Officer — Commissioner of Patents and Trademarks